(12) United States Patent
Lu et al.

(10) Patent No.: US 8,289,961 B2
(45) Date of Patent: Oct. 16, 2012

(54) LINK STATE IDENTIFIER COLLISION HANDLING

(75) Inventors: Wenhu Lu, San Jose, CA (US); Alfred C. Lindem, III, Cary, NC (US); Uma S. Chunduri, Fremont, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 410 days.

(21) Appl. No.: 12/544,789

(22) Filed: Aug. 20, 2009

(65) Prior Publication Data

US 2011/0044330 A1 Feb. 24, 2011

(51) Int. Cl.
*H04L 12/28* (2006.01)
(52) U.S. Cl. .................................. 370/389; 709/236
(58) Field of Classification Search .................. 370/389, 370/237, 351; 709/236
See application file for complete search history.

(56) References Cited

U.S. PATENT DOCUMENTS

| | | | |
|---|---|---|---|
| 7,808,968 B1 * | 10/2010 | Kalmanek et al. | 370/351 |
| 2008/0049622 A1 * | 2/2008 | Previdi et al. | 370/237 |

OTHER PUBLICATIONS

J. Moy, "OSPF Version 2", Network Working Group, Request for Comments: 2328, STD: 54, Apr. 1998, 244 pages.
Wenhu Lu, RFC Editor, RFC Errata, "RFC2328, OSPF Version 2, Apr. 1998", Source of RFC: Legacy, Errata ID: 1745, Date Reported: Mar. 27, 2009, 1 page.

* cited by examiner

*Primary Examiner* — Dang Ton
*Assistant Examiner* — Wei Zhao
(74) *Attorney, Agent, or Firm* — Blakely Sokoloff Taylor & Zafman, LLP

(57) ABSTRACT

Methods and apparatus for a network element to handle LSID collisions to prevent different LSAs associated with different routes from sharing the same LSID. According to one embodiment, responsive to determining that a tentative LSID that is generated for a first route that is being added collides with an LSID that is assigned to an LSA for a second route, and that one of the first and second routes is a host route, the host route is suppressed. If the first route is the host route, suppressing includes not originating an LSA for the first route. If the second route is the host route, suppressing includes purging the LSA for the second route and not originating an LSA for the second route. Although the host route is suppressed, network reachability of the range subsuming the host route is provided through the route that is not the host route.

20 Claims, 9 Drawing Sheets

| | ROUTE 1 = 10.0.0.0/16 | ROUTE 2 = 10.0.0.0/24 | ROUTE 3 = 10.0.0.0/32 | ROUTE 4 = 10.0.0.255/32 |
|---|---|---|---|---|
| T₁ ADD ROUTE 1 (10.0.0.0/16) | LSID = 10.0.0.0 | | | |
| T₂ ADD ROUTE 2 (10.0.0.0/24) | LSID = 10.0.0.0 | LSID = 10.0.0.255 | | |
| T₃ ADD ROUTE 3 (10.0.0.0/32) | LSID = 10.0.0.0; SUPPRESSOR OF ROUTE 3 | LSID = 10.0.0.255 | SUPPRESSED ROUTE | |
| T₄ ADD ROUTE 4 (10.0.0.255/32) | LSID = 10.0.0.0; SUPPRESSOR OF ROUTE 3 | LSID = 10.0.0.255; SUPPRESSOR OF ROUTE 4 | SUPPRESSED ROUTE | SUPPRESSED ROUTE |
| T₅ WITHDRAW ROUTE 1 (10.0.0.0/16) | | LSID = 10.0.0.255; SUPPRESSOR OF ROUTE 4 | UNSUPPRESS; LSID = 10.0.0.0 | SUPPRESSED ROUTE |
| T₆ WITHDRAW ROUTE 2 (10.0.0.0/24) | | | LSID = 10.0.0.0 | UNSUPPRESS; LSID = 10.0.0.255 |
| T₇ WITHDRAW ROUTE 3 (10.0.0.0/32) | | | | LSID = 10.0.0.255 |
| T₈ WITHDRAW ROUTE 4 (10.0.0.255/32) | | | | |

FIG. 8

| | ROUTE 1 = 10.0.0.0/16 | ROUTE 2 = 10.0.0.0/24 | ROUTE 3 = 10.0.0.0/32 | ROUTE 4 = 10.0.0.255/32 |
|---|---|---|---|---|
| $T_1$ | ADD ROUTE 2 (10.0.0.0/24) | LSID = 10.0.0.0 | | |
| $T_2$ | ADD ROUTE 3 (10.0.0.0/32) | LSID = 10.0.0.0; SUPPRESSOR OF ROUTE 3 | SUPPRESSED ROUTE | |
| $T_3$ | ADD ROUTE 4 (10.0.0.255/32) | LSID = 10.0.0.0; SUPPRESSOR OF ROUTE 3 | SUPPRESSED ROUTE | LSID = 10.0.0.255 |
| $T_4$ | ADD ROUTE 1 (10.0.0.0/16) — LSID = 10.0.0.0; TRANSFER OF SUPPRESSOR OF ROUTE 3 | LSID = 10.0.0.255; SUPPRESSOR OF ROUTE 4 | SUPPRESSED ROUTE | SUPPRESSED ROUTE |
| $T_5$ | WITHDRAW ROUTE 1 (10.0.0.0/16) | LSID = 10.0.0.255; SUPPRESSOR OF ROUTE 4 | UNSUPPRESS; LSID = 10.0.0.0 | SUPPRESSED ROUTE |
| $T_6$ | WITHDRAW ROUTE 4 (10.0.0.255/32) | LSID = 10.0.0.255; | LSID = 10.0.0.0 | |
| $T_7$ | WITHDRAW ROUTE 3 (10.0.0.0/32) | LSID = 10.0.0.255 | | |
| $T_8$ | WITHDRAW ROUTE 2 (10.0.0.0/24) | | | |

FIG. 9

LINK STATE IDENTIFIER COLLISION HANDLING

BACKGROUND

1. Field

Embodiments of the invention relate to the field of link state routing protocols; and more specifically, to the handling of Link State Identifier collisions during link state assignment.

2. Background

Link state routing protocols such as Open Shortest Path First (OSPF) (e.g., as defined in RFC 2328, April 1998) use Link State Identifiers (LSIDs) as keys when identifying Link State Advertisements (LSAs). LSAs for different routes that share the same LSID may cause various problems including an incorrect topology view, data mapping problems, multiple routes pointing to the same LSA, etc.

For the majority of routes, the LSAs associated with each route are assigned an LSID that is equivalent to the network address of that route. The network address for a route is calculated by performing a bitwise AND operation on the route prefix and the route mask. For example, since the network address for the route [10.0.0.0, 255.255.0.0] is 10.0.0.0, LSAs for that route are typically assigned an LSID value of 10.0.0.0.

While routes with the same prefix are deemed different if their masks differ, the network address of those routes can be the same. For example, the routes [10.0.0.0, 255.255.0.0] and [10.0.0.0, 255.255.255.0] are different yet share the same network address of 10.0.0.0. Thus, the LSIDs for LSAs associated with these routes would collide. In such a case, the RFC 2328 describes an algorithm that attempts to assign different LSIDs for the LSAs for those routes (the algorithm is specified in Appendix E of RFC 2328). The LSID collision handling algorithm in RFC 2328 selects the route with the longer mask and performs a bitwise NOT operation on that mask, performs a bitwise OR operation on that result with the route prefix, and assigns the result as the LSID. For example, using the two routes above, the route [10.0.0.0, 255.255.255.0] is selected, the result of the bitwise NOT operation on the mask 255.255.255.0, which equals 0.0.0.255, is bitwise ORed with the route prefix 10.0.0.0 resulting in a value of 10.0.0.255, which is then assigned as the LSID for LSAs of that route. The route that is not selected is assigned an LSID that is equivalent to the network address.

The LSID collision handling algorithm described in RFC 2328 does not handle LSID collisions correctly when one of the colliding routes is a host route. A host route is a route with a host mask (e.g., 255.255.255.255). For example, consider the routes [10.0.0.0, 255.255.255.0] and [10.0.0.0, 255.255.255.255], which have the same network address (10.0.0.0). According to the LSID collision handling algorithm of RFC 2328, the route [10.0.0.0, 255.255.255.255] (which is a host route) is selected, the result of the bitwise NOT operation on the mask 255.255.255.255, which equals 0.0.0.0, is bitwise ORed with the route prefix 10.0.0.0 resulting in a value of 10.0.0.0, which is then assigned as the LSID for LSAs of that route. Thus, using the LSID collision handling algorithm of RFC 2328, the different routes [10.0.0.0, 255.255.255.0] and [10.0.0.0, 255.255.255.255] will have LSAs that share the same LSID of 10.0.0.0. Therefore, the LSID collision handling algorithm described in RFC 2328 as applied to host routes results in the LSAs of different routes sharing the same LSID which can result in the problems described above.

SUMMARY

Methods and apparatus for a network element to handle LSID collisions to prevent different LSAs associated with different routes from sharing the same LSID are described. According to one embodiment of the invention, the network element generates a tentative LSID for a first route during an LSID assignment process. The network element determines that the value of the tentative LSID is already assigned to a second route, and that either the first route or the second route is a host route, wherein the host route has a host route mask and the first and second routes are different. Responsive to determining that the first is the host route, the first route is suppressed to prevent an LSID collision between the first and second routes including not originating an LSA for the first route. Responsive to determining that the second route is the host route, the second route is suppressed to prevent an LSID collision between the first and second routes including purging an LSA of the second route, and an LSA for first route is originated with the LSID that was assigned to the second route. Although the host route is suppressed, network reachability of the range subsuming the host route is provided through the route that is not the host route. If the route that would have had an LSID collision with the host route is withdrawn prior to the host route, the host route is unsuppressed and an LSA is automatically originated for the host route with an LSID that was previously assigned to the LSA of the other route.

According to another embodiment of the invention, a customer edge network element distributes OSPF routes to a first provider edge network element through the OSPF protocol, wherein at least some of the OSPF routes are host routes, wherein a host route is a route that has a host route mask. The first provider edge network element distributes the OSPF routes to a second provider edge network element through the Border Gateway Protocol (BGP). The first provider edge network element includes an OSPF module that implements the OSPF protocol and generates LSAs and assigns LSIDs to the LSAs. During LSID assignment, the OSPF module suppresses those of the OSPF routes that are host routes that otherwise would have corresponding LSAs with colliding LSIDs with other LSAs. Suppressing the OSPF routes includes removing LSAs associated with suppressed host routes and not originating LSAs for the suppressed host routes. Although LSAs are not originated for those suppressed host routes, network reachability is provided for each suppressed host route through the route associated with the LSA that had a colliding LSID with that host route. Each suppressed host route is unsuppressed when the route associated with the LSA that would have the same LSID as the host route is withdrawn prior to that suppressed host route, and an LSA is automatically originated for that unsuppressed host route with the LSID that was previously assigned to the LSA of the other route.

According to another embodiment of the invention, a network element for handling LSID collisions includes an OSPF module to maintain a link state database (LSDB) and generate LSAs that include LSIDs. During LSID assignment for the LSAs, the OSPF module assigns LSIDs to LSAs for routes based on the network prefixes and route masks of those routes, suppresses those of the routes which are host routes that otherwise would have a corresponding LSA with an LSID that collides with an LSID of a different LSA associated with a different route. The suppression of those routes includes removing the LSAs associated with the suppressed host routes and not originating LSAs for the suppressed host routes. Although LSAs are not originated for those suppressed host routes, network reachability is provided for each suppressed host route through the route associated with the LSA that had a colliding LSID with that host route. Each suppressed host route is unsuppressed when the route associated with the LSA that would have the same LSID as the host route is withdrawn prior to that suppressed host route, and an LSA is automatically originated for that unsuppressed host route with the LSID that was previously assigned to the LSA of the other route.

Thus different routes, including host routes, are prevented from originating LSAs that share the same LSID while each of the routes is reachable even in the presence of suppressed host routes. When a route associated with an LSA that has an LSID that would have collided with an LSA for a suppressed host route is withdrawn prior to that suppressed host route, that suppressed host route is unsuppressed and an LSA is originated for that host route with the LSID that was assigned to the LSA of the other route.

BRIEF DESCRIPTION OF THE DRAWINGS

The invention may best be understood by referring to the following description and accompanying drawings that are used to illustrate embodiments of the invention. In the drawings:

FIG. 8 is a block diagram that illustrates LSID assignments for a set of routes that arrive in an order according to one embodiment of the invention; and FIG. 9 is a block diagram that illustrates LSID assignments for a set of routes that arrive in a different order than FIG. 8 according to one embodiment of the invention.

DETAILED DESCRIPTION

Figure 1:
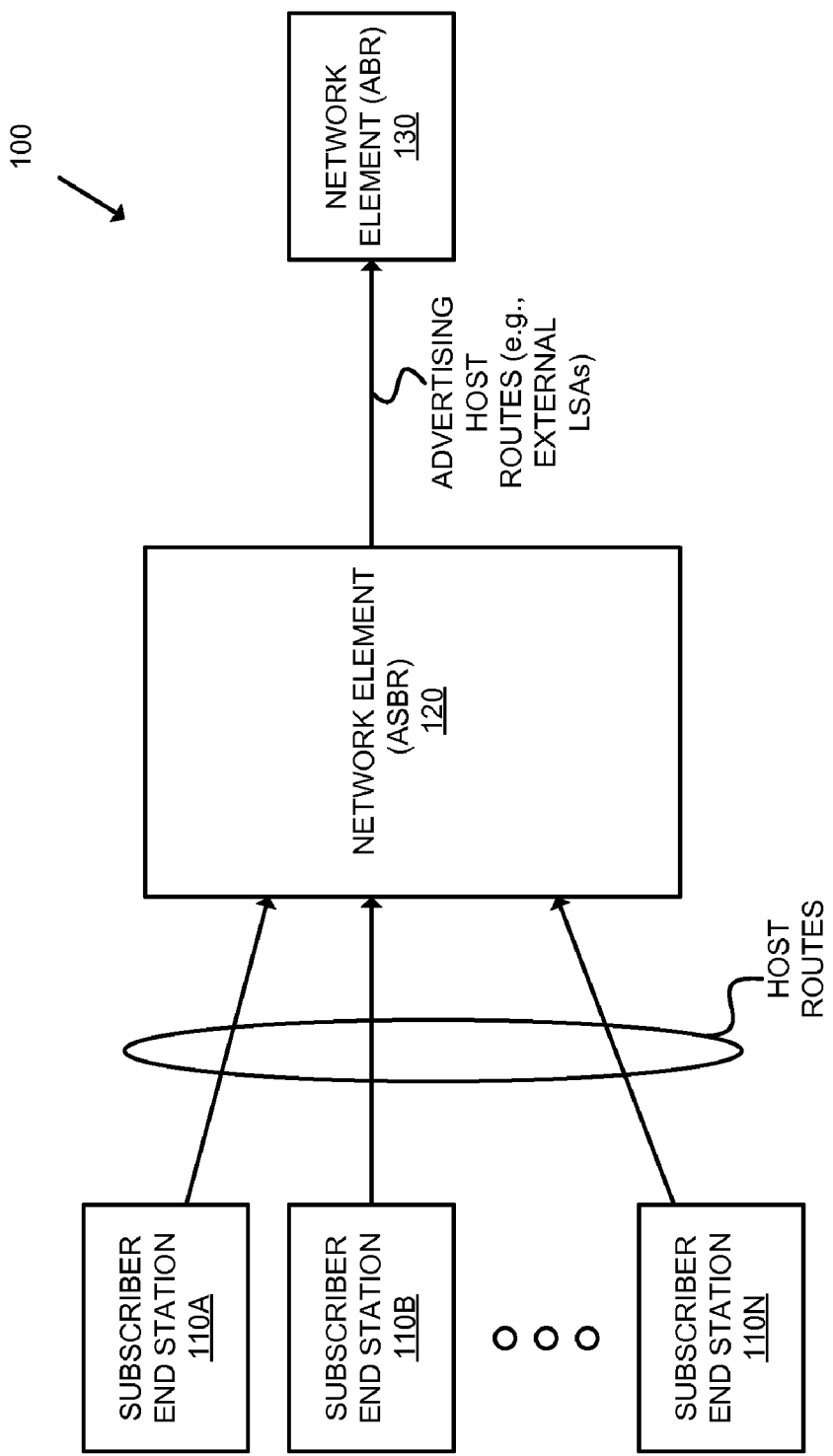
FIG. 1 is a block diagram that illustrates an exemplary network according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The techniques shown in the figures can be implemented using code and data stored and executed on one or more electronic devices (e.g., an end station, a network element, etc.). Such electronic devices store and communicate (internally and/or with other electronic devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software, that communicatively interconnects other equipment on the network (e.g., other network elements, end stations, etc.). Some network elements are "multiple services network elements" that provide support for multiple networking functions (e.g., routing, bridging, switching, Layer 2 aggregation, session border control, and/or subscriber management), and/or provide support for multiple application services (e.g., data, voice, and video). Subscriber end stations (e.g., servers, workstations, laptops, palm tops, mobile phones, smartphones, multimedia phones, Voice Over Internet Protocol (VOIP) phones, portable media players, GPS units, gaming systems, set-top boxes, etc.) access content/services provided over the Internet and/or content/services provided on virtual private networks (VPNs) overlaid on the Internet. The content and/or services are typically provided by one or more end stations (e.g., server end stations) belonging to a service or content provider or end stations participating in a peer to peer service, and may include public webpages (free content, store fronts, search services, etc.), private webpages (e.g., username/password accessed webpages providing email services, etc.), corporate networks over VPNs, etc. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Typically, a network element includes a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network element through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway), etc.). By way of example, a service card may be used to terminate IPsec tunnels and execute the attendant authentication and encryption algorithms.

A method and apparatus for handling LSID collisions is described. In one embodiment of the invention, host routes whose LSAs would have an LSID collision with different routes are suppressed such that LSAs for those host routes are not originated and/or purged from a link state database (LSDB). Suppressing those host routes prevents multiple different routes from having LSAs that share the same LSID. Thus, problems that can occur to LSAs with the same LSID being originated for different routes (e.g., an incorrect topology, data integrity issues, black-holing of traffic, software crashes, etc.) are avoided.

In one embodiment, each suppressed host route is associated with the route whose LSA has the LSID that would collide with the LSID that would be assigned to the LSA of the suppressed host route. Responsive to that other route being withdrawn prior to the suppressed host route, the host route is unsuppressed and an LSA is originated with the LSID that was assigned to the LSA of that other route.

FIG. 1 is a block diagram that illustrates an exemplary network 100 according to one embodiment of the invention. As illustrated in FIG. 1, the network 100 includes the subscriber end stations 110A-110N coupled with the network element 120 (directly or indirectly). The network element 120 acts as an Autonomous System Border Router (ASBR) in the network 100. The network element 120 can learn the host routes from the subscriber end stations 110A-110N through route redistribution into OSPF on the network element 120 and/or the host routes can be statically configured on the network element 120 (which are also typically provided to OSPF through route redistribution). Although not illustrated, the network element 120 also learns routes in addition to the host routes assigned to the subscriber end stations 110A-110N.

The network element 120 advertises learned routes, including the host routes, into the OSPF domain (e.g., to the network element 130, which is acting as an Area Border Router (ABR) in the network 100). For example, the network element 120 can advertise the host routes assigned to the subscriber end stations 110A-110N and the route that corresponds to the pool from which the host routes are allocated. In one embodiment, the network element 120 advertises the routes, including the host routes, to the network element 130 using OSPF Type 5 LSAs (External LSAs).

Figure 2:
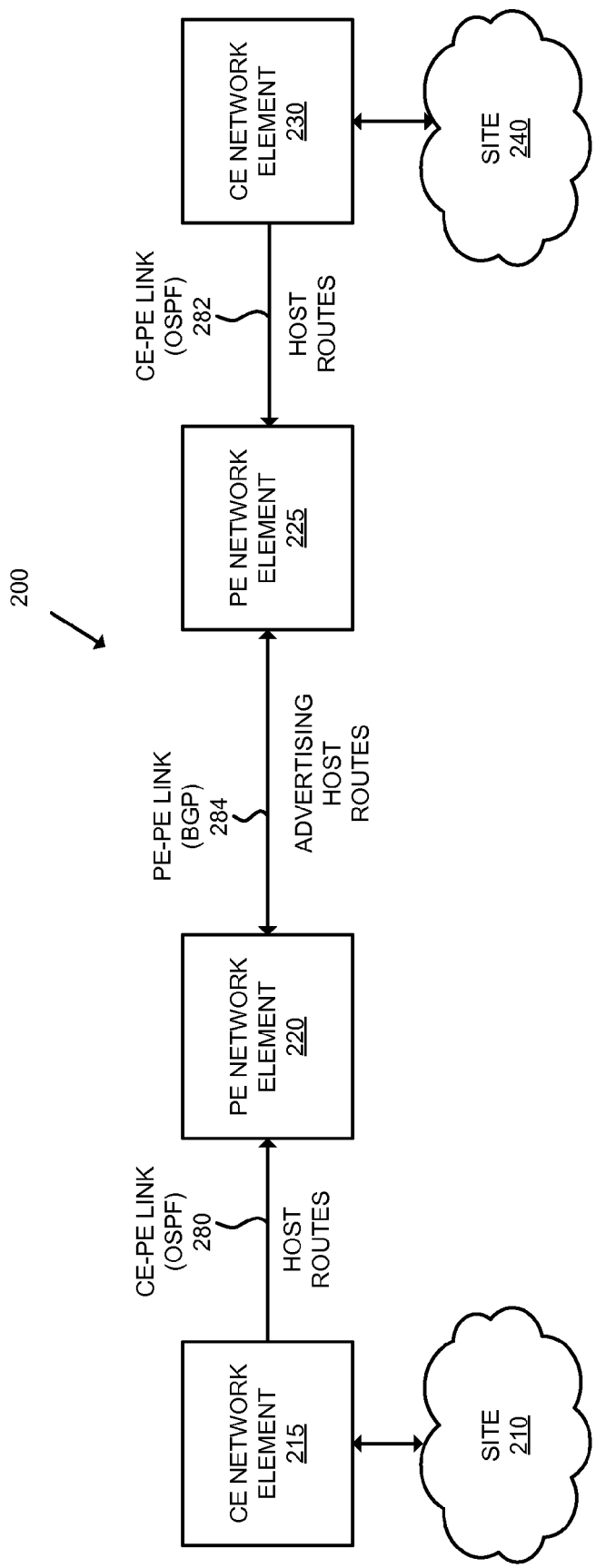
FIG. 2 is a block diagram that illustrates an exemplary network according to one embodiment of the invention.

FIG. 2 is a block diagram that illustrates an exemplary network 200 according to one embodiment of the invention. As illustrated in FIG. 2, the network 200 is a VPN (e.g., a layer 3 VPN). The Customer Edge (CE) network element 215 communicates with the Provider Edge (PE) network element 220 over the CE-PE link 280, which is an OSPF link. Similarly, the CE network element 230 communicates with the PE network element 225 over the CE-PE link 282, which is an OSPF link. The PE network elements 220 and 225 communicate over the PE-PE link 284, which is a BGP link.

The CE network element 215 advertises routes, including host routes, from the site 210 to the PE network element 220 over the CE-PE link 280. The CE network element 230 advertises routes, including host routes, from the site 240 to the PE network element 225 over the CE-PE link 282. The sites 210 and 240 can each include multiple subscriber end stations. The PE network elements 220 and 225 export the routes, including the host routes, learned from the CE network elements 215 and 230 respectively to each other. As will be described in greater detail later herein, the routes exported via BGP can be redistributed into OSPF.

It should be understood that the networks illustrated in FIGS. 1 and 2 are exemplary, and embodiments of the invention are applicable to different types of networks where host routes are advertised by a link state protocol.

Figure 3:
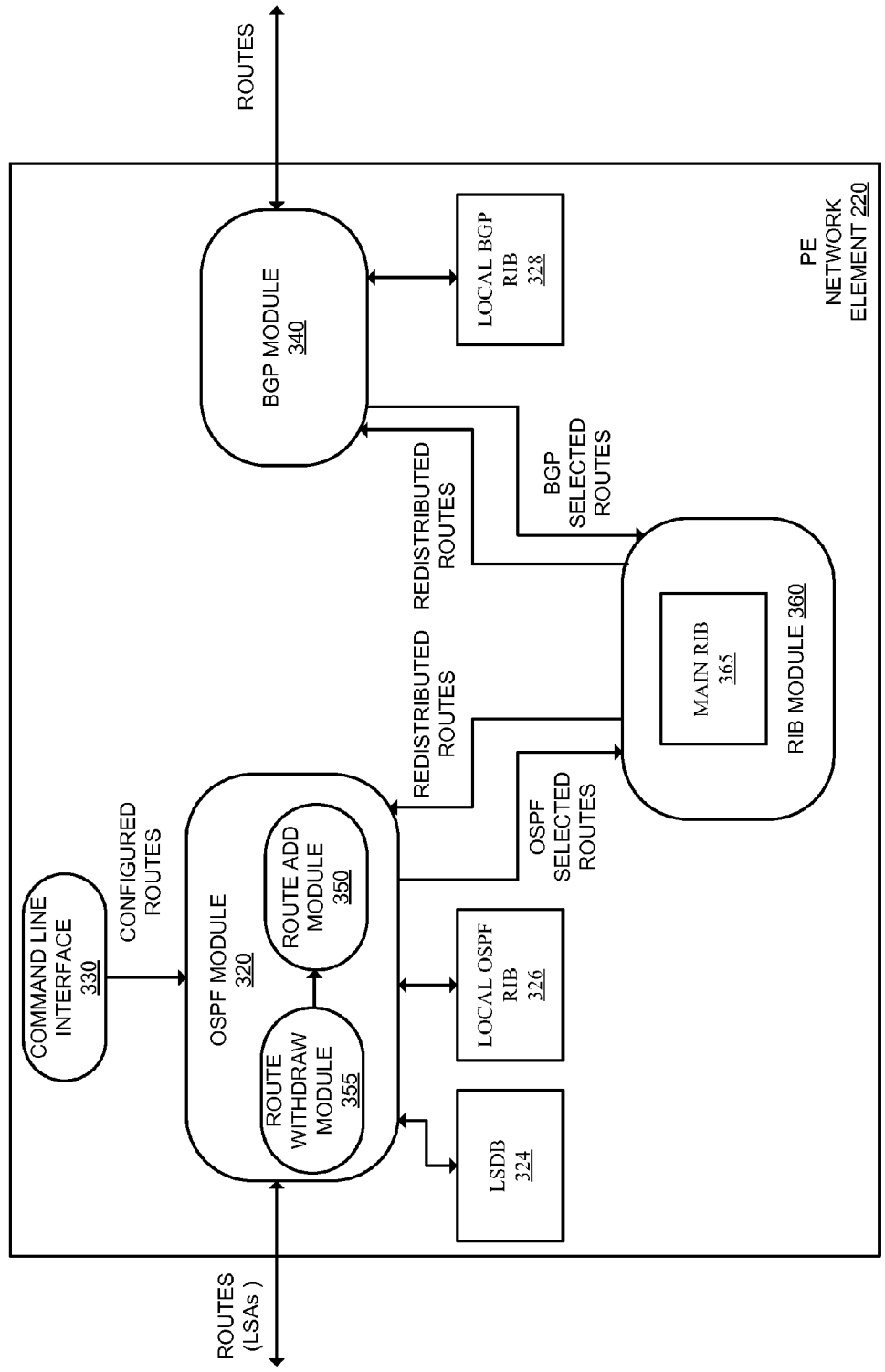
FIG. 3 is a block diagram that illustrates an exemplary network element for handling LSID collisions according to one embodiment of the invention.

FIG. 3 is a block diagram that illustrates an exemplary network element for handling LSID collisions according to one embodiment of the invention. While FIG. 3 illustrates the network element 220, it should be understood that the network element 120 illustrated in FIG. 1 and the network element 225 include similar functionality in some embodiments of the invention.

The network element 220 includes the OSPF module 320, which implements an implementation of an OSPF protocol, coupled with a Routing Information Base (RIB) module 360, which is coupled with the BGP module 340, which implements an implementation of the BGP module 340. The OSPF module 320 and the BGP module 340 download route entries to the main RIB 365 based on certain route metrics (the metrics can be different for the OSPF module 320 and the BGP module 340). The RIB module 360 manages the main RIB 365 (e.g., processes route updates, route deletes, etc.) and can also cause routes to be redistributed between routing protocols. For example, the RIB module 360 can cause routes learned by the BGP module 340 (which can include host routes exported by the PE network element 225) to be redistributed to the OSPF module 320. As another example, the RIB module 360 can cause routes learned by the OSPF module 320 (which can include host routes learned from the CE network element 215) to be redistributed to the BGP module 340 for exporting to the PE network element 225.

While embodiments describe that the redistribution functionality is provided by the RIB module 360 which manages the main RIB 365, it should be understood that that the redistribution of routes between protocols can be performed differently (e.g., the OSPF module 320 and the BGP module 340 can directly exchange routes, a redistribution module separate and apart from the main RIB 365 may perform the redistribution, etc.). According to one embodiment, a system operator configures the network element 200 to redistribute the OSPF routes into the BGP module 340 and to redistribute the BGP routes into the OSPF module 320.

The OSPF module 320 can learn routes from other network elements that implement OSPF (e.g., from the CE network element 215) in the form of LSAs (the OSPF module 320 also originates LSAs). The OSPF module 320 can also learn routes that are redistributed from other protocols (e.g., redistributed routes from the BGP module 340) and/or statically learned (e.g., configured by operators of the network element 220 via the command line interface 330). Responsive to learning a new route, the OSPF module 320 begins a route add process that is performed by the route add module 350. An exemplary route add process will be described in greater detail with respect to FIGS. 4 and 6. The OSPF module 320 also includes a route withdraw module 355 to perform a route withdrawal process, which will be described in greater detail with respect to FIGS. 5 and 7.

The network element 220 also includes the following data structures: the link state database (LSDB) 324, the local OSPF RIB 326, the local BGB RIB 328, and the main RIB 365. However, it should be understood that a different number of data structures may be used in embodiments of the invention described herein (e.g., a data structure that combines two or more of the above data structures, etc.).

The LSDB 324, which is coupled with the OSPF module 320, stores LSAs associated with routes in the network. In some implementations there is a separate LSDB for each area the network element 220 belongs, and in some implementations there are different LSDBs for different LSA types. As will be described in greater detail later herein, the OSPF module 320 adds LSAs to the LSDB 324 and removes LSAs from the LSDB 324.

The local OSPF RIB 326, which is coupled with the OSPF module 320, stores OSPF route entries including those which are not downloaded to the main RIB 365 and those which an LSA is not originated. For example, the local OSPF RIB 326 can store suppressed routes, which are routes that will not be originated an LSA (which will be described in greater detail later herein). According to one embodiment, the local OSPF RIB 326 maintains an association between each suppressed host route and the route which would have otherwise had an LSA with an LSID that would collide with an LSA for that suppressed host route.

The main RIB 365 stores routes selected by the OSPF module 320 and the BGP module 340. Although not shown in order not to obscure understanding of the invention, a subset of the routes in the main RIB 365 (sometimes referred to as active route entries) is downloaded to line cards of the network element 220 for use in forwarding traffic. The local BGP RIB 328, which is coupled with the BGP module 340, stores BGP route entries including those which are not downloaded to the main RIB 365.

Figure 4:
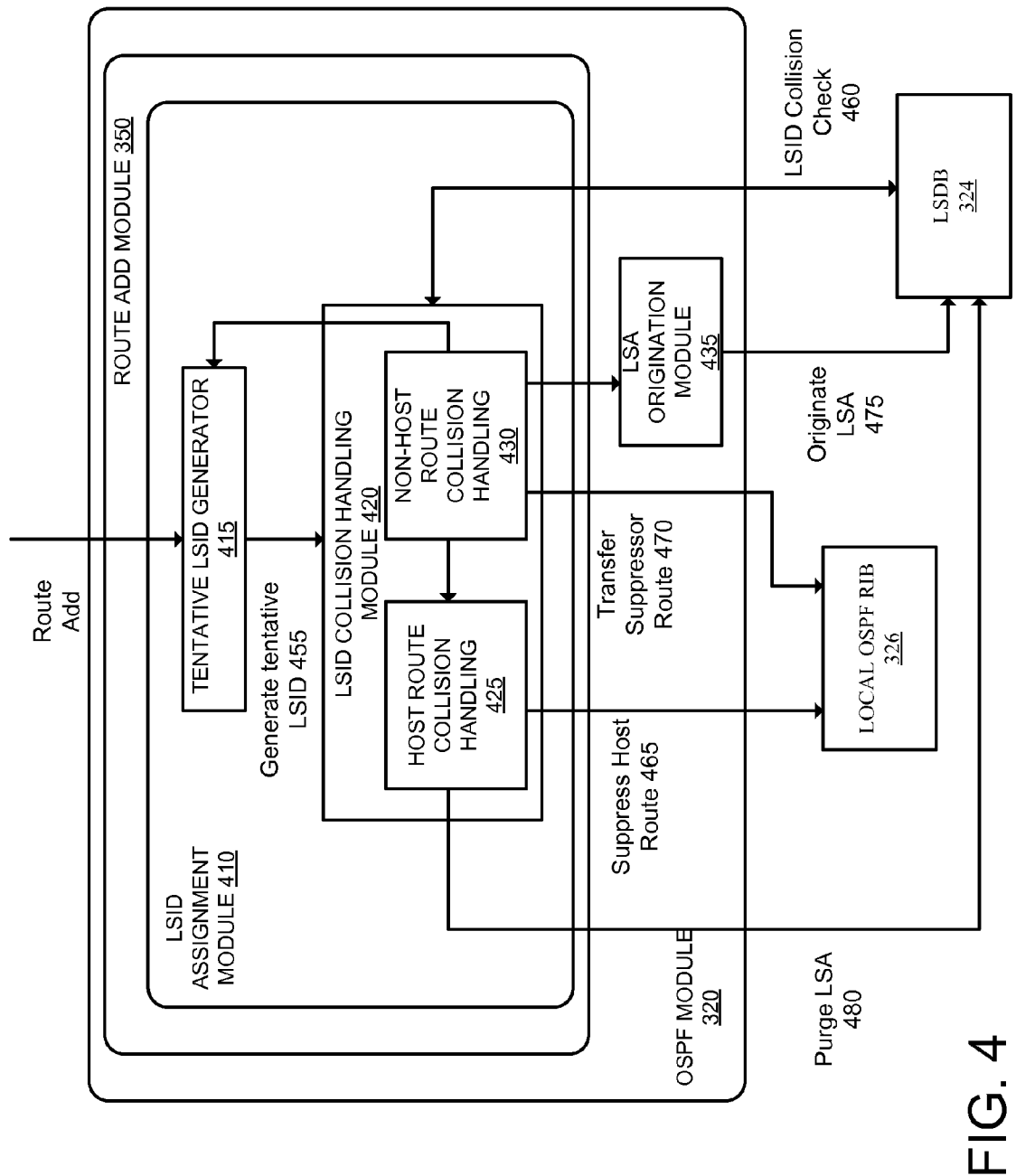
FIG. 4 is a data flow diagram illustrating an exemplary route add process that assigns LSIDs for routes including handling LSID collisions according to one embodiment of the invention.

FIG. 4 is a data flow diagram illustrating an exemplary route add process that assigns LSIDs for routes including handling LSID collisions according to one embodiment of the invention.

As illustrated in FIG. 4, the route add module 350 includes the tentative LSID generator to generate tentative LSIDs, and the LSID collision handling module 420 to handle LSID collisions. The OSPF module 320 invokes the route add module 350 for routes that it has learned. Routes can be learned from other OSPF peers, redistributed by a different protocol, or statically configured.

The tentative LSID generator 415 generates a tentative LSID at operation 455 for the route that is being added. Initially, the tentative LSID will be the network address of the route, which is calculated by performing a bitwise AND operation on the route prefix and the route mask. The tentative LSID is passed to the LSID collision module 420.

The LSID collision module 420 determines whether the tentative LSID collides with an LSID assigned to an existing LSA of a different route. For example, the LSID collision handling module 420 performs the LSID collision check operation 460 to access the LSDB 324 to determine whether any of the LSAs in the LSDB are assigned an LSID equivalent to the tentative LSID. If there is no collision, then the tentative LSID will be assigned and the LSID assignment process completes. The OSPF module 320 can subsequently invoke the LSA origination module 435 to originate an LSA for that route with the assigned LSID. However, if there is an LSID collision, and either the route that is being added or the existing route (the route that is associated with the LSA having an LSID equal to the tentative LSID) is a host route, then the host route collision handling process 425 is invoked.

The host route collision handling process 425 suppresses the route that is the host route by performing the suppress host route operation 465. If the route that is being added is the host route, then the suppress host route operation 465 includes not originating an LSA for that host route and therefore not including an LSA for that route in the LSDB 324. The LSID for the LSA for the existing route (the route that would otherwise have had an LSID collision with the route that is being added) remains the same. In one embodiment, the suppress host route operation 465 also includes modifying the route entry for the host route in the local OSPF RIB 326 to indicate that the host route is being suppressed (e.g., a flag indicating that the host route is being suppressed and LSAs for the route should not be originated). According to one embodiment, the LSA origination module 435 skips those routes that have a set suppressed flag in its route entry.

If the existing route is the host route, then the suppress host route operation 465 includes performing the purge LSA operation 480 to purge the LSA associated with that host route from the LSDB 324 (e.g., the host route collision handling process 425 accesses the LSDB 324 and removes the LSA for the suppressed host route). In one embodiment, the suppress host route operation 465 also includes modifying the route entry for the host route in the local OSPF RIB 326 to indicate that the host route is being suppressed. Thus, regardless whether the host route is the route being added or is the existing route, in some embodiments the suppress host route operation 465 includes modifying the route entry for the host route in the local OSPF RIB 326 to indicate the host route is being suppressed. The LSA for the route that is being added then takes over the LSID that was previously assigned to the LSA associated with the host route. The LSA origination module 435 may then perform the originate LSA operation 475 to originate an LSA with that LSID for the route (which is then stored in the LSDB 324). For purposes of explanation, the host route that is being suppressed is sometimes referred to as the "suppresses" route and the route that is associated with the suppressee route which would otherwise have had an LSID collision with the suppressee route is sometimes referred to as the "suppressor" route.

It should be understood that a route that would have otherwise had an LSID collision with a suppressed host route provides IP reachability for the range subsuming the host mask route. As an example therefore, the redistributed routes are reachable in an autonomous system even in the presence of suppressed IP host routes.

The OSPF module 320 associates the suppressee route and the suppressor route such that if the suppressor route is withdrawn, the suppressee route is automatically added and an LSA originated for that route with the LSID that was assigned to the suppressor route. For example, the host route collision handling process 425 associates the suppressee route with the suppressor route. In one embodiment of the invention, the association takes place within the local OSPF RIB 326. For example, in one embodiment, the route entries in the local OSPF RIB 326 indicate whether a route is being suppressed by another route and the identity of that route, and whether a route is suppressing another route and the identity of that route.

If there is an LSID collision, and neither the route that is being added or the existing route is a host route, the non-host route collision handling process 430 is invoked. According to one embodiment, the non-host route collision handling process 430 is a modified version of the LSID collision handling algorithm described in RFC 2328. The non-host route collision handling process 430 selects the route with the longest mask and determines whether that route is associated with a suppressed route (i.e., whether the selected route is a suppressor route of a host suppressee route). It should be understood that only those routes that are selected that have an LSA currently existing in the LSDB may be a suppressor route (thus the route that is being added cannot be a suppressor route).

If the selected route is a suppressor route, the non-host route collision handling process 430 performs the transfer suppressor route operation 470 to transfer the association from the selected route (the route with the longer route mask) to the route with shorter route mask (e.g., by modifying the route entries in the local OSPF RIB 326). The transfer of the association occurs because the selected route will be assigned a different LSID and the route that is not selected (the route with the shorter route mask) will assume the LSID that was assigned to the selected route. The LSID that would have been used by the suppressed host route does not change.

A new tentative LSID is generated for the selected route (e.g., the tentative LSID generator 415 performs a bitwise NOT operation on the mask of the selected route, and performs a bitwise OR operation on that result with the selected route's prefix (similarly as defined by RFC 2328). After generating the new tentative LSID for the selected route, the LSID collision check operation 460 is again performed since it is possible that this new tentative LSID is already assigned to an LSA for a different route (which may or may not be a host route). If there is not a collision, then an LSA for that route can be originated with the tentative LSID. The route that is not selected takes over the use of the LSID that was previously assigned to the LSA of the selected route.

If the selected route is not a suppressor route, then the non-host route collision handling process 430 generates a new tentative LSID for the selected route similarly as defined by RFC 2328. The LSID collision check operation 460 again is performed to determine whether the new tentative LSID is already assigned to an LSA for a different route. The route that is not selected takes over the use of the LSID that was previously assigned to the LSA of the selected route.

Figure 5:
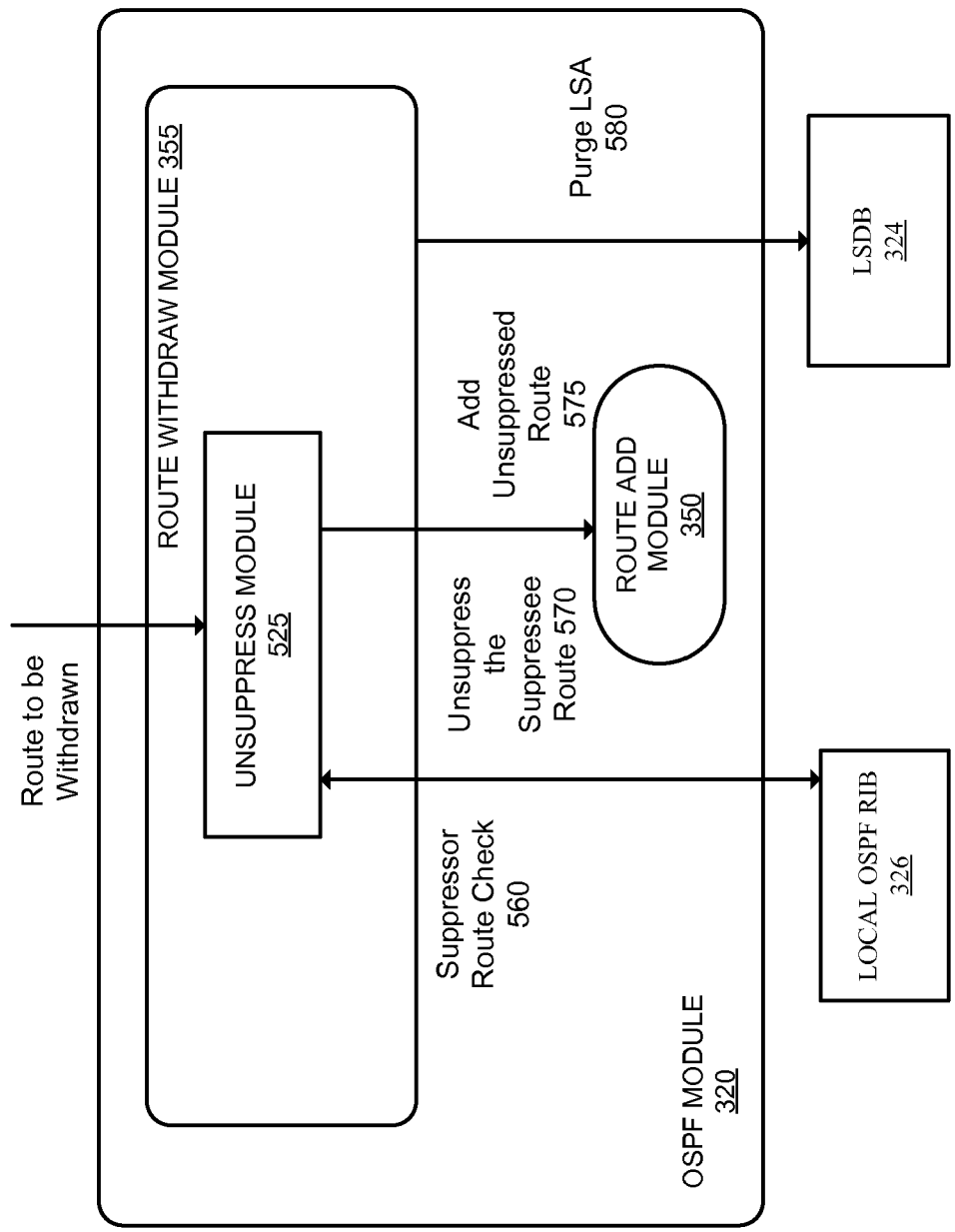
FIG. 5 is a data flow diagram illustrating an exemplary route withdrawal process including unsuppressing routes according to one embodiment of the invention.

FIG. 5 is a data flow diagram illustrating an exemplary route withdrawal process including unsuppressing routes according to one embodiment of the invention. FIG. 5 illustrates the interactions between the route withdraw module 355 with the route add module 350, the local OSPF RIB 326, and the LSDB 324.

Responsive to receiving an instruction to withdraw a route, the route withdraw module 355 invokes the unsuppress module 525. The unsuppress module 525 performs the suppressor route check operation 560 to determine whether the route that is to be withdrawn is currently is associated with a suppressed route (i.e., whether the route is a suppressor route). In one embodiment, the suppressor route check operation 560 includes accessing the route entry for the route to be withdrawn in the local OSPF RIB 326 (e.g., to determine whether a suppressor flag is set for the route to be withdrawn). If the suppressor flag is set, the unsuppress module 525 performs a route lookup in the local OSPF RIB 326 with the keys (LSID, IP host mask) where the value of the LSID is the LSID that was being used by the suppressor route. If the lookup fails (e.g., it is returning a NULL value), the suppressee route is already withdrawn. However, if the lookup returns a route, the unsuppress module 525 unsuppresses that route (e.g., originates an LSA with the LSID that was used by the suppressor route). In another embodiment, the route entry for the suppressor route in the local OSPF RIB 326 also indicates the identity of the suppressee route. In one embodiment, the unsuppress module 525 also optionally determines whether the route that is being withdrawn is currently suppressed (i.e., whether the route is a suppressee route).

If the route that is being withdrawn is a suppressor route, then the unsuppress module 525 performs the unsuppress the suppressee route operation 570 to unsuppress the suppressee route. According to one embodiment, the unsuppress the suppressee route operation 570 includes accessing and modifying the route entry for the suppressee route in the local OSPF RIB 326 to remove any indication that the host route is suppressed (e.g., clearing the flag indicating that the host route is a suppressee route). The route withdraw module 355 then invokes the route add module 350 to add the unsuppressed host route. According to one embodiment, the route add module 350 will perform the add unsuppressed route operation 575 that assigns the LSID for LSA associated with the unsuppressed host route that was previously assigned to the suppressor route (i.e., the unsuppressed host route takes over the LSID that was previously assigned to the suppressor route).

It should be understood that since the suppressor route subsumes its suppressee route, the suppressee route becomes unreachable when the suppressor route is withdrawn prior to that suppressee route. By unsuppressing that route and advertising an LSA for that route throughout the network, the unsuppressed host route will again be reachable.

The route withdraw module 355 also performs the purge LSA operation 580 to remove the LSA associated with the route that is being withdrawn (e.g., the unsuppress module 525 accesses the LSDB 324 and deletes the LSA associated with the route that is being withdrawn). In one embodiment, the route withdraw module 355 also removes the route entry for the route that is being withdrawn from the local OSPF RIB 326.

Figure 6:
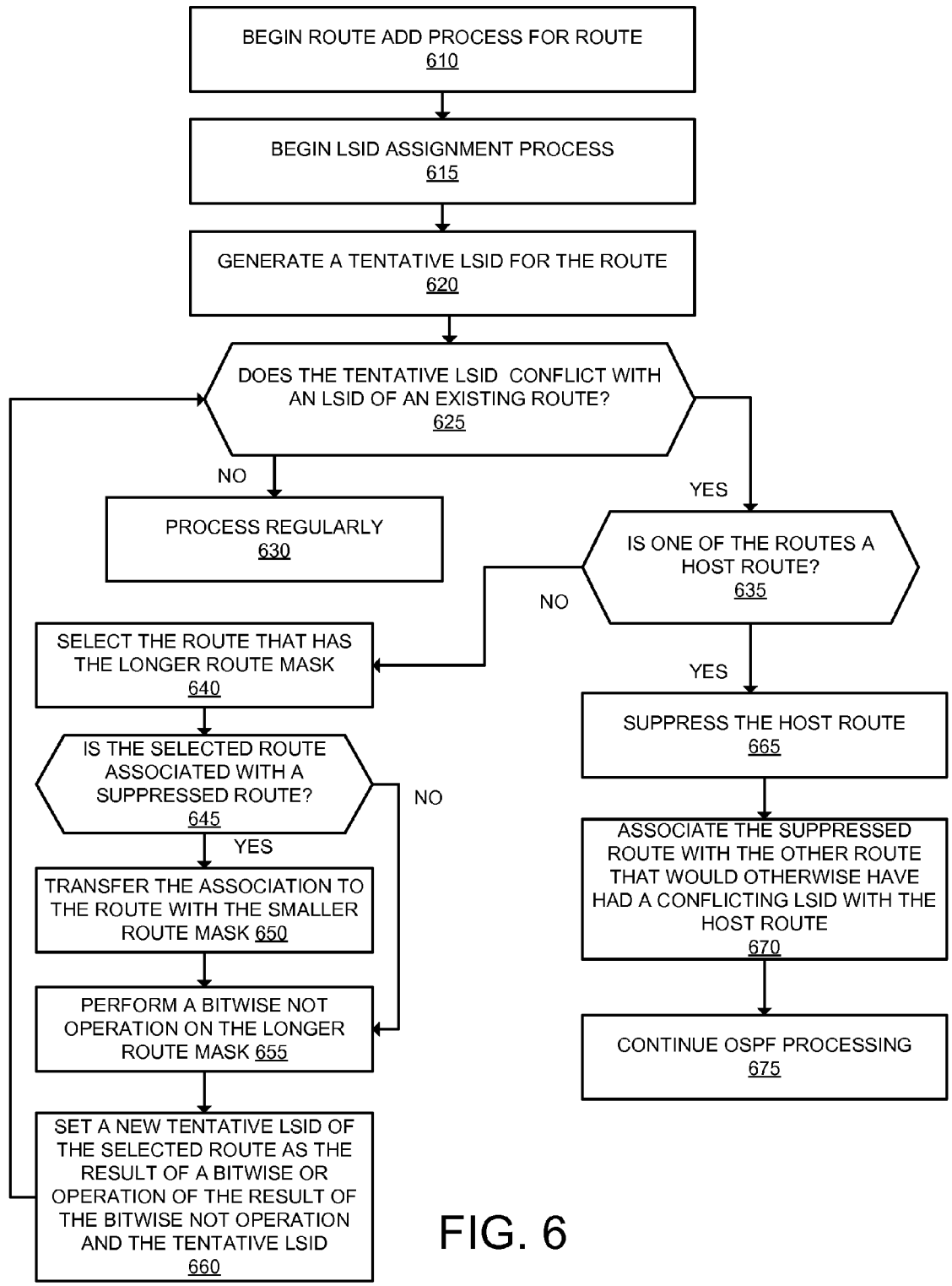
FIG. 6 is a flow diagram illustrating exemplary operations performed during a route add process including handling LSID collisions according to one embodiment of the invention.

FIG. 6 is a flow diagram illustrating exemplary operations performed during a route add process including handling LSID collisions according to one embodiment of the invention. FIG. 6 will be described with reference to the exemplary LSID assignments of FIGS. 8 and 9, however it should be understood that the operations of FIG. 6 can be performed with reference to other LSID assignments. In addition, the operations of FIG. 6 will be described with reference to the exemplary embodiment of FIG. 4. However, it should be understood that the operations of FIG. 6 can be performed by embodiments of the invention other than those discussed with reference to FIG. 4, and the embodiments discussed with reference to FIG. 4 can perform operations different than those discussed with reference to FIG. 6.

At block 610, the OSPF module 320 begins a route add process for Route 1 [10.0.0.0, 255.255.0.0] of FIG. 8. The route may be learned from other OSPF routers, redistributed by a different protocol, or statically configured. For purposes of explanation, FIG. 8 represents the assignment of LSIDs for LSAs associated with routes that are learned in the network element 220 at different times. Initially (prior to Route 1 being added), there are no LSAs in the LSDB and therefore no LSIDs assigned.

Flow moves from block 610 to block 615, where an LSID assignment process begins. With reference to FIG. 4, the LSID assignment module 410 has begun an LSID assignment for Route 1. Flow then moves to block 620 where the tentative LSID generator 415 generates a tentative LSID for the Route 1. In one embodiment, the tentative LSID is generated according to RFC 2328. For example, the tentative LSID for the Route 1 is the network address of the route (10.0.0.0).

Flow moves from block 620 to block 625 where the LSID collision handling module 420 determines whether the tentative LSID for Route 1 collides with an LSID of an existing route. Since there are no LSIDs that currently assigned, there is not an LSID collision. Accordingly, flow moves to block 630 where the processing operates in the regular way (e.g., an LSA is originated for Route 1 and is assigned an LSID of 10.0.0.0). Therefore, as illustrated in FIG. 8, at a time $T_1$, Route 1 is associated with the LSID value 10.0.0.0.

Route 2 [10.0.0.0, 255.255.255.0] of FIG. 8 is the next route to be added. The tentative LSID for Route 2 is the network address of the route (10.0.0.0). Since Route 1 is associated with the LSID 10.0.0.0, there is an LSID collision. Accordingly, flow moves from block 625 to block 635.

At block 635, a determination is made whether Route 1 or Route 2 is a host route. Since neither of those routes is a host route (they both do not have a host mask), flow moves to block 640. According to one embodiment, the operations described in reference to blocks 640-660 are performed by the non-host route collision handling process 430. At block 640, Route 2 is selected since it has a longer route mask than Route 1. Flow moves from block 640 to block 645.

At block 645, the non-host route collision handling process 430 determines whether Route 2 is associated with a suppressed route. For example, the non-host route collision handling process 430 accesses the entry for Route 2 in the local OSPF RIB 326 (e.g., to determine whether a suppressee flag is set). Since Route 2 is not currently associated with a suppressed route, flow moves to block 655. At block 655, a bitwise NOT operation is performed on the mask of Route 2 (255.255.255.0) resulting in a value of 0.0.0.255. Flow moves from block 655 to block 660, where the new tentative LSID for Route 2 is the result of a bitwise OR operation of the result of the bitwise NOT operation with the tentative LSID. Thus, the new tentative LSID for Route 2 is the value of 0.0.0.255|10.0.0.0, which equals 10.0.0.255.

Flow moves from block 660 back to block 625, where the LSID collision handling module 420 determines whether the tentative LSID 10.0.0.255 collides with an LSID associated with an existing route. As illustrated in FIG. 8, the LSID 10.0.0.255 is not currently assigned to an LSA for a different route. Thus, flow moves to block 630 where the processing operates in the regular way and an LSA is originated for Route 2 and is assigned an LSID of 10.0.0.255. Therefore, as illustrated in FIG. 8, at a time $T_2$, Route 1 is associated with the LSID value 10.0.0.0 and Route 2 is associated with the LSID value 10.0.0.255.

Route 3 [10.0.0.0, 255.255.255.255] of FIG. 8 is the next route to be added. The tentative LSID for Route 3 is the network address of the route (10.0.0.0) (e.g., as a result of performing block 620). Since Route 1 is associated with the LSID 10.0.0.0, there is an LSID collision. Accordingly, flow moves from block 625 to block 635.

At block 635, the LSID collision handling module 420 determines whether Route 1 or Route 3 is a host route. Since Route 3 is a host route (it has a host mask), flow moves to block 665. According to one embodiment, the operations described in reference to blocks 665 and 670 are performed by the host route collision handling process 425.

At block 665, the host route collision handling process 425 suppresses Route 3 since it is a host route. Since Route 3 is in the process of being added (and thus there is currently not an LSA for Route 3), suppressing Route 3 includes preventing an LSA from being originated for Route 3. In one embodiment, suppressing the host route also includes modifying the route entry for Route 3 in the local OSPF RIB 326 to indicate that Route 3 is being suppressed (e.g., a suppressee flag is set for Route 3 in the local OSPF RIB 326). It should be understood that even though Route 3 is being suppressed, Route 1 provides IP reachability for the range subsuming Route 3.

Flow moves from block 665 to block 670, where the host route collision handling process 425 associates Route 3 with Route 1 (e.g., associates the suppressee route with the suppressor route). As will be described in greater detail later herein, Route 3 and Route 1 are associated such that if Route 1 is withdrawn prior to Route 3, an LSA for Route 3 can be originated with the LSID assigned to Route 1. The association between Route 3 and Route 1 can be performed in different ways in different embodiments. For example, the route entry for Route 1 in the local OSPF RIB 326 can be modified to indicate that it is a suppressor route (e.g., a suppressor flag is set) and optionally that it is suppressing Route 3. The route entry for Route 3 in the local OSPF RIB 326 can also be modified to indicate that it is a suppressee route (e.g., a suppressee flag is set) and optionally that it is being suppressed by Route 1. As another example, a data structure different than the local OSPF RIB 326 can be used to associate Route 3 with Route 1.

Flow moves from block 670 to block 675 where OSPF processing continues. Therefore, as illustrated in FIG. 8, at a time $T_3$, Route 1 is associated with the LSID value 10.0.0.0 and is a suppressor of Route 3, Route 2 is associated with the LSID value 10.0.0.255, and Route 3 is a suppressee route (suppressed by Route 1).

Route 4 [10.0.0.255, 255.255.255.255] of FIG. 8 is the next route to be added. The tentative LSID for Route 4 is the network address of the route (10.0.0.255) (e.g., as a result of performing block 620). The LSID collision handling module 420 determines there is an LSID collision since the value 10.0.0.255 is currently associated with Route 2. Accordingly, flow moves from block 625 to block 635.

At block 635, the LSID collision handling module 420 determines whether Route 2 or Route 4 is a host route. Since Route 4 is a host route (it has a host mask), flow moves to block 665. At block 665, the host route collision handling process 425 suppresses Route 4 since it is a host route. Since Route 4 is in the process of being added (and thus there is currently not an LSA for Route 4), suppressing Route 4 includes preventing an LSA from being originated for Route 4. In one embodiment, suppressing the host route also includes modifying the route entry for Route 4 in the local OSPF RIB 326 to indicate that Route 4 is being suppressed. It should be understood that even though Route 4 is being suppressed, Route 2 provides IP reachability for the range subsuming Route 4.

Flow moves from block 665 to block 670, where the host route collision handling process 425 associates Route 4 with Route 2 (the suppressee route with the suppressor route) such that if Route 2 is withdrawn prior to Route 4, an LSA for Route 4 can be originated with the LSID assigned to Route 2. The association can be performed in a similar manner as described above with reference to Routes 1 and 3. Flow moves from block 670 to block 675 where OSPF processing continues. Therefore, as illustrated in FIG. 8, at a time $T_4$, Route 1 is associated with the LSID value 10.0.0.0 and is a suppressor of Route 3, Route 2 is associated with the LSID value 10.0.0.255 and is a suppressor of Route 4, Route 3 is a suppressee route (suppressed by Route 1), and Route 4 is a suppressee route (suppressed by Route 2).

Thus, after the time $T_4$ of FIG. 8, the LSDB 324 includes an LSA that is assigned an LSID of 10.0.0.0 (associated with Route 1) and an LSA that is assigned an LSID of 10.0.0.255 (associated with Route 2). In addition, Route 1 provides IP reachability for the range subsuming Route 3 (which is suppressed) and Route 2 provides IP reachability for the range subsuming Route 4 (which is suppressed).

Figure 7:
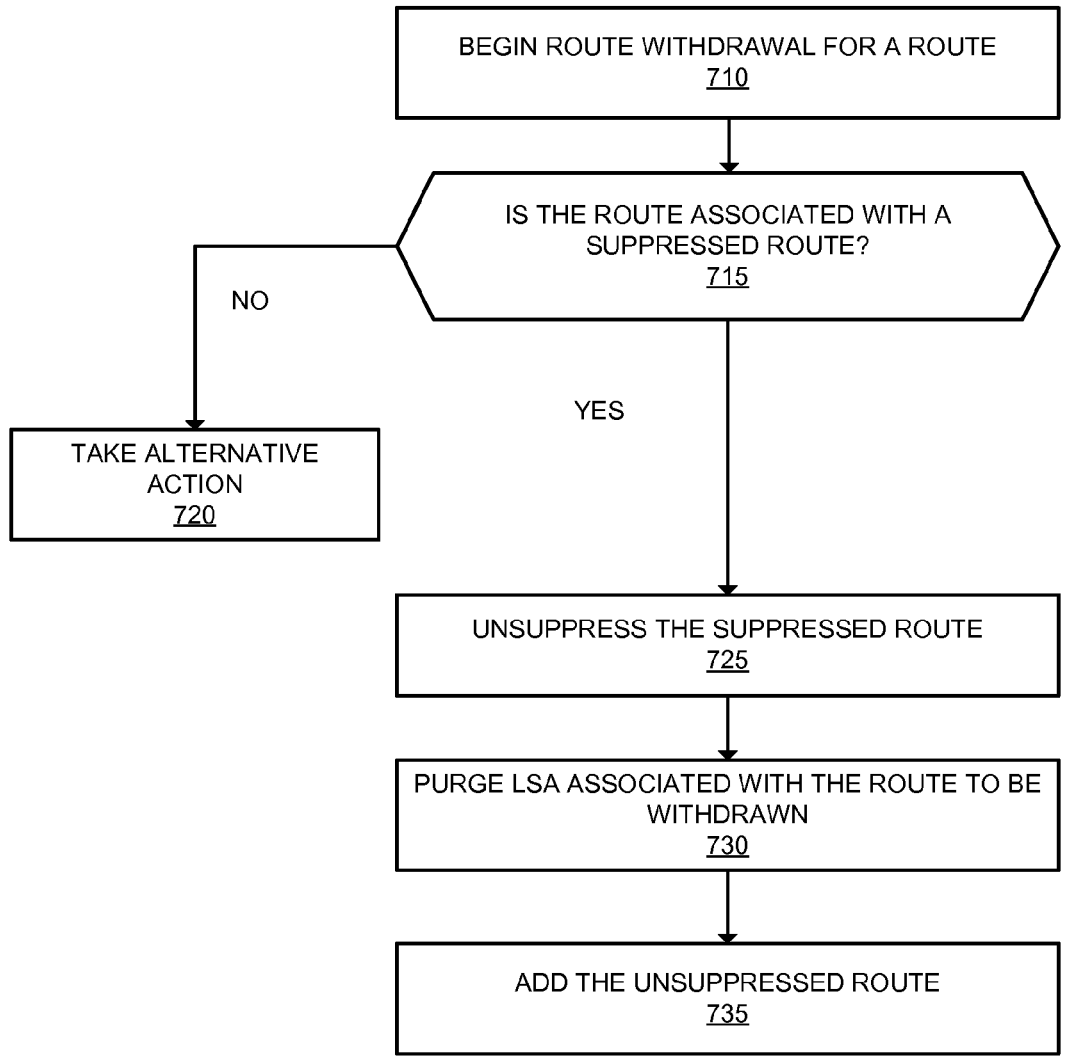
FIG. 7 is a flow diagram illustrating exemplary operations performed during a route withdrawal process according to one embodiment of the invention.

FIG. 7 is a flow diagram illustrating exemplary operations performed during a route withdrawal process according to one embodiment of the invention. FIG. 7 will be described with reference to the exemplary LSID assignments of FIGS. 8 and 9, however it should be understood that the operations of FIG. 7 can be performed with reference to other LSID assignments. In addition, the operations of FIG. 7 will be described with reference to the exemplary embodiment of FIG. 5. However, it should be understood that the operations of FIG. 7 can be performed by embodiments of the invention other than those discussed with reference to FIG. 5, and the embodiments discussed with reference to FIG. 5 can perform operations different than those discussed with reference to FIG. 7.

At block 710, the OSPF module 320 begins a route withdrawal process for Route 1 [10.0.0.0, 255.255.0.0] of FIG. 8. It should be understood that the route can be withdrawn for many reasons (e.g., the subscriber belonging to the route has ended their session, etc.). Flow moves from block 710 to block 715 where the route withdraw module 355 determines whether Route 1 is associated with a suppressed route. In one embodiment, the route withdraw module 355 accesses the route entry for Route 1 in the local OSPF RIB 326 to determine whether a suppressor flag is set. Since Route 1 is a suppressor route of Route 3, flow moves to block 725.

At block 725, the unsuppress module 525 unsuppresses the suppressed route (Route 3). The unsuppress module 525 determines the identity of the suppressed route through the association between the suppressor route (Route 1) and the suppressed route (Route 3). For example, in some embodiments the route entry for Route 1 in the local OSPF RIB 326 indicates that Route 1 is a suppressor route but does indicate the identity of the suppressed route. In such embodiments, a route lookup is performed on the local OSPF RIB 326 with the keys (LSID, IP host mask) where the value of the LSID is the LSID that was assigned to the LSAs for Route 1. Such a route lookup results in a return of the identity of Route 3. In other embodiments, the route entry for Route 1 in the local OSPF RIB 326 indicates that it is a suppressor route and also indicates the identity of the suppressee route (Route 3). The unsuppression of Route 3 also includes the unsuppress module 525 modifying the entry in the local OSPF RIB 326 for Route 3 to remove the indication that Route 3 is a suppressed route (e.g., by clearing the suppressee flag).

Flow moves from block 725 to block 730, where the LSA associated with Route 1 is purged from the LSDB 324 and removed from the local OSPF RIB 326. Flow moves from block 730 to block 735, where a process of adding Route 3 begins (e.g., flow moves to block 610 of FIG. 6). In the add route process for Route 3, an LSA with the LSID that was assigned to Route 1 (10.0.0.0) is originated for Route 3. Therefore, as illustrated in FIG. 8, at a time $T_5$, Route 1 has been withdrawn, Route 2 is associated with the LSID value 10.0.0.255 and is a suppressor of Route 4, Route 3 is now unsuppressed and is associated with the LSID value 10.0.0.0, and Route 4 is a suppressee route (suppressed by Route 2).

It should be understood that in some embodiments of the invention the step of purging the existing LSA (the LSA for the route that is being withdrawn) and the step of originating the new LSA (the LSA with the same LSID as the withdrawn LSA which is currently being originated (e.g., the LSA for the host route)) are performed in a single step by the new LSA simply replacing the existing LSA.

Route 2 [10.0.0.0, 255.255.255.0] of FIG. 8 is the next route to be withdrawn. Flow moves from block 710 to block 715 where the route withdraw module 355 determines whether Route 2 is associated with a suppressed route. Since Route 2 is a suppressor route of Route 4, flow moves to block 725. At block 725, the unsuppress module 525 unsuppresses Route 4 including modifying the entry in the local OSPF RIB 326 for Route 4 to remove the indication that Route 4 is a suppressed route (e.g., by clearing the suppressee flag).

Flow moves from block 725 to block 730, where the LSA associated with Route 2 is purged from the LSDB 324 and removed from the local OSPF RIB 326. Flow moves from block 730 to block 735, where a process of adding Route 4 begins (e.g., flow moves to block 610 of FIG. 6). In the add route process for Route 4, an LSA with the LSID that was assigned to Route 1 (10.0.0.255) is originated for Route 4. Therefore, as illustrated in FIG. 8, at a time $T_6$, Route 1 has been withdrawn, Route 2 has been withdrawn, Route 3 is associated with the LSID value 10.0.0.0, and Route 4 is now unsuppressed and is associated with the LSID value 10.0.0.255.

Route 3 [10.0.0.0, 255.255.255.255] of FIG. 8 is the next route to be withdrawn. Flow moves from block 710 to block 715 where the route withdraw module 355 determines whether Route 3 is associated with a suppressed route. Since Route 3 is not associated with a suppressed route, flow moves to block 720 where alternative action is taken (e.g., the withdraw process proceeds normally and the LSA associated with Route 3 is purged from the LSDB 324). Therefore, as illustrated in FIG. 8, at a time $T_7$, Route 1 has been withdrawn, Route 2 has been withdrawn, Route 3 has been withdrawn, and Route 4 is now unsuppressed and is associated with the LSID value 10.0.0.255.

Route 4 [10.0.0.255, 255.255.255.255] of FIG. 8 is the next route to be withdrawn. Flow moves from block 710 to block 715 where the route withdraw module 355 determines whether Route 4 is associated with a suppressed route. Since Route 4 is not associated with a suppressed route, flow moves to block 720 where alternative action is taken (e.g., the withdraw process proceeds normally and the LSA associated with Route 4 is purged from the LSDB 324). Therefore, as illustrated in FIG. 8, at a time $T_8$, Route 1 has been withdrawn, Route 2 has been withdrawn, Route 3 has been withdrawn, and Route 4 is withdrawn.

FIG. 9 is a block diagram that illustrates LSID assignments for a set of routes that arrive in a different order than FIG. 8 according to one embodiment of the invention. As illustrated in FIG. 9, the same routes are added as in FIG. 8 (e.g., Route 1 [10.0.0.0, 255.255.0.0], Route 2 [10.0.0.0, 255.255.255.0], Route 3 [10.0.0.0, 255.255.255.255], and Route 4 [10.0.0.255, 255.255.255.255]); however they are added in a different order than in FIG. 8.

Route 2 [10.0.0.0, 255.255.255.0] of FIG. 9 is the first route to be added. At block 610, the OSPF module 320 begins a route add process for Route 2 of FIG. 9. Similarly as described with reference to FIG. 8, initially (prior Route 2 being added), there are no LSAs in the LSDB and therefore there are no LSIDs assigned. Flow moves from block 610 to block 615 where an LSID assignment process begins. With reference to FIG. 4, the LSID assignment module 410 has begun an LSID assignment for Route 2. Flow then moves to block 620 where the tentative LSID generator 415 generates a tentative LSID for the Route 2. In one embodiment, the tentative LSID is generated according to RFC 2328. For example, the tentative LSID for the Route 2 is the network address of the route (10.0.0.0).

Flow moves from block 620 to block 625 where the LSID collision handling module 420 determines whether the tentative LSID for Route 2 collides with an LSID associated with an existing route. Since there are no LSIDs that currently assigned, there is not a collision. Accordingly, flow moves to block 630 where the processing operates in the regular way (e.g., an LSA associated with Route 2 is originated and assigned an LSID value of 10.0.0.0). Therefore, as illustrated in FIG. 9, at a time $T_1$, Route 2 is associated with the LSID value 10.0.0.0.

Route 3 [10.0.0.0, 255.255.255.255] is the next route to be added. The tentative LSID for Route 3 is the network address of the route (10.0.0.0). Since Route 2 is associated with the LSID 10.0.0.0, there is an LSID collision. Accordingly, flow moves from block 625 to block 635.

At block 635, a determination is made whether Route 2 or Route 3 is a host route. Since Route 3 is a host route (it has a host mask), flow moves to block 665. At block 665, the host route collision handling process 425 suppresses Route 3 since it is a host route. Since Route 3 is in the process of being added (and thus there is currently not an LSA for Route 3), suppressing Route 3 includes preventing an LSA from being originated for Route 3. In one embodiment, suppressing the host route also includes modifying the route entry for Route 3 in the local OSPF RIB 326 to indicate that Route 3 is being suppressed (e.g., by setting a suppressee flag). It should be understood that even though Route 3 is being suppressed, Route 2 provides IP reachability for the range subsuming Route 3.

Flow moves from block 665 to block 670, where the host route collision handling process 425 associates Route 3 with Route 2 (e.g., associates the suppressee route with the suppressor route). As will be described in greater detail later herein, Route 3 and Route 2 are associated such that if Route 2 is withdrawn prior to Route 3, an LSA for Route 3 can be originated with the LSID assigned to Route 2. The routes can be associated in a similar way as previously described herein (e.g., the host route collision handling process causes the entry for Route 2 to be modified to indicate that it is a suppressor route and optionally that it is suppressing Route 3).

Flow moves from block 670 to block 675 where OSPF processing continues. Therefore, as illustrated in FIG. 9, at a time $T_2$, Route 2 is associated with the LSID value 10.0.0.0 and is a suppressor of Route 3 and Route 3 is a suppressee route (suppressed by Route 2).

Route 4 [10.0.0.255, 255.255.255.255] of FIG. 9 is the next route to be added. The tentative LSID for Route 4 is the network address of the route (10.0.0.255) (e.g., the tentative LSID is generated as a result of performing block 620). The LSID collision handling module 420 determines at block 625 that there is not an LSID collision since the value 10.0.0.255 is not currently associated with a different route. Accordingly, flow moves from block 625 to block 630 where processing operates in the regular way (e.g., an LSA associated with Route 4 is originated and assigned an LSID value of 10.0.0.255). Therefore, as illustrated in FIG. 9, at a time $T_3$, Route 2 is associated with the LSID value 10.0.0.0 and is a suppressor of Route 3, Route 3 is a suppressee route (suppressed by Route 2), and Route 4 is associated with the LSID value 10.0.0.255.

Route 1 [10.0.0.0, 255.255.0.0] of FIG. 9 is the next route to be added. The tentative LSID for Route 1 is the network address of the route (10.0.0.0) (e.g., the tentative LSID is generated as a result of performing block 620). The LSID collision handling module 420 determines at block 625 that there is an LSID collision since the value 10.0.0.0 is associated with Route 2. Accordingly, flow moves from block 625 to block 635.

At block 635, the LSID collision handling module 420 determines whether Route 1 or Route 2 is a host route. Since neither of those routes is a host route (they both do not have a host mask), flow moves to block 640. At block 640, Route 2 is selected since it has a longer route mask than Route 1. Flow moves from block 640 to block 645.

At block 645, the non-host route collision handling process 430 determines whether Route 2 is associated with a suppressed route. For example, the non-host route collision handling process 430 accesses the entry for Route 2 in the local OSPF RIB 326 to determine whether Route 2 is associated with a suppressed route (e.g., whether the suppressor flag is set for Route 2). Since Route 2 is a suppressor route that is suppressing Route 3, flow moves to block 650.

At block 650, the non-host route collision handling process 430 transfers the association with Route 3 from Route 2 to Route 1. In other words, since Route 1 is taking over the role of the suppressor route of Route 3 from Route 2, Route 1 is now associated with Route 3. In some embodiments, the route entry for Route 2 in the local OSPF RIB 326 is modified to remove the indication that it is a suppressor route (e.g., by clearing the suppressor flag) and the route entry for Route 1 is modified to include an indication that it is a suppressor route (e.g., by setting the suppressor flag for that entry). In some embodiments, the entry for Route 1 is also modified to identify the suppressee route (e.g., Route 3). In some embodiments, the route entry for Route 3 in the local OSPF RIB 326 is modified to indicate that Route 1 is now the route that is suppressing Route 3.

Route 1 takes over the role of the suppressor route from Route 2 since Route 2 will be assigned a different LSID according to RFC 2328 (it has a longer route mask than Route 1). The status of Route 3 being suppressed does not change since it would have an LSID collision with Route 1 and it is a host route. Thus, Route 1 provides IP reachability for the range subsuming Route 3.

Flow moves from block 650 to block 655, where a bitwise NOT operation is performed on the mask of Route 2 (255.255.255.0) resulting in a value of 0.0.0.255. Flow moves from block 655 to block 660, where the new tentative LSID for Route 2 is the result of a bitwise OR operation of the result of the bitwise NOT operation with the tentative LSID. Thus, the new tentative LSID for Route 2 is the value of 0.0.0.255|10.0.0.0, which equals 10.0.0.255.

Flow moves from block 660 back to block 625, where the LSID collision handling module 420 determines whether the tentative LSID 10.0.0.255 collides with an LSID associated with an existing route. As illustrated in FIG. 9, the LSID 10.0.0.255 is currently assigned to the LSA for Route 4. Accordingly, flow moves to block 635 where the LSID collision handling module 420 determines whether one of the Routes 2 and 4 is a host route. Since Route 4 is a host route, flow moves to block 665.

At block 665, the host route collision handling process 425 suppresses Route 4 since it is a host route. Since Route 4 is already associated with one or more LSAs, suppressing Route 4 includes purging the LSA for Route 4 from the LSDB 324 and modifying the route entry for Route 4 in the local OSPF RIB 326 to indicate that Route 4 is a suppressee route (e.g., by setting the suppressee flag) and optionally that it is being suppressed by Route 2. It should be understood that Route 2 provides IP reachability for the range subsuming Route 4.

Flow moves from block 665 to block 670, where the host route collision handling process 425 associates Route 4 with Route 2 such that if Route 2 is withdrawn prior to Route 4, an LSA for Route 4 can be originated with the LSID associated to Route 2. The association between Route 4 and Route 2 can be performed in a similar way as described previously.

Flow moved from block 670 to block 675, where OSPF processing continues as normal. Therefore, as illustrated in FIG. 9, at a time $T_4$, Route 1 is associated with the LSID value 10.0.0.0 and is now a suppressor route of Route 3 (transferred from Route 2), Route 2 is no longer the suppressor route of Route 3 and is associated with the LSID value 10.0.0.255 and is now the suppressor route of Route 4, Route 3 is a suppressee route that is being suppressed by Route 1, and Route 4 is a suppressee route that is being suppressed by Route 2.

With reference to FIG. 7, at block 710 the OSPF module begins a route withdrawal process for Route 1 [10.0.0.0, 255.255.0.0] of FIG. 9. Flow moves from block 710 to block 715 where the route withdraw module 355 determines whether Route 1 is associated with a suppressed route (e.g., by accessing the route entry for Route 1 in the local OSPF RIB 326 to determine whether Route 1 is a suppressor route). Since Route 1 is a suppressor route of Route 3, flow moves to block 725. At block 725, the unsuppress module 525 unsuppresses Route 3. For example, the unsuppress module 525 modifies the entry in the local OSPF RIB 326 for Route 3 to remove the indication that Route 3 is a suppressed route.

Flow moves from block 725 to block 730, where the LSA associated with Route 1 is purged from the LSDB 324. In some embodiments, the route entry for Route 1 is also removed from the local OSPF RIB 326. Flow moves from block 730 to block 735, where a process of adding Route 3 begins (e.g., flow moves to block 610 of FIG. 6). In the add route process for Route 3, an LSA with the LSID that was assigned to Route 1 (10.0.0.0) is originated for Route 3. Therefore, as illustrated in FIG. 9, at a time $T_5$, Route 1 has been withdrawn, Route 2 is associated with the LSID value 10.0.0.255 and is a suppressor of Route 4, Route 3 is now unsuppressed and is associated with the LSID value 10.0.0.0, and Route 4 is a suppressee route (suppressed by Route 2).

Route 4 [10.0.0.255, 255.255.255.255] of FIG. 9 is the next route to be withdrawn. Flow moves from block 710 to block 715 where the route withdraw module 355 determines whether Route 4 is associated with a suppressed route. Since Route 4 is itself a suppressed route, it is not associated with a suppressed route (that is, it is not currently acting as a suppressor route of a different route). Therefore, flow moves to block 720 where alternative action is taken (e.g., the LSA associated with Route 4 is purged from the LSDB 324, the indication that Route 2 is a suppressor route that is suppressing Route 4 is removed, etc.). Thus, as illustrated in FIG. 9 at a time $T_6$, Route 1 has been withdrawn, Route 2 is associated with the LSID value 10.0.0.255 but is no longer a suppressor of Route 4, Route 3 is associated with the LSID value 10.0.0.00, and Route 4 is now withdrawn.

Route 3 [10.0.0.0, 255.255.255.255] of FIG. 9 is the next route to be withdrawn. Flow moves from block 710 to block 715 where the route withdraw module 355 determines whether Route 3 is associated with a suppressed route. As indicated in FIG. 9, Route 3 is not associated with a suppressed route. Accordingly, flow moves to block 720 where alternative action is taken (e.g., the LSA associated with Route 3 is purged from the LSDB 324). Therefore, as illustrated in FIG. 9 at a time $T_7$, Route 1 has been withdrawn, Route 2 is associated with the LSID value 10.0.0.255, Route 3 is now withdrawn, and Route 4 is withdrawn.

Route 2 [10.0.0.0, 255.255.255.0] of FIG. 9 is the last route to be withdrawn. Flow moves from block 710 to block 715 where the route withdraw module 355 determines whether Route 2 is associated with a suppressed route. As indicated in FIG. 9, Route 2 is not associated with a suppressed route. Accordingly, flow moves to block 720 where alternative action is taken (e.g., the LSA associated with Route 2 is purged from the LSDB 324). Therefore, as illustrated in FIG. 9 at a time $T_8$, Route 1 has been withdrawn, Route 2 is now withdrawn, Route 3 is withdrawn, and Route 4 is withdrawn.

It should be understood that suppressing LSAs from being originated for host routes that would otherwise have had an LSID collision with existing routes prevents multiple different routes from sharing the same LSID. Thus problems that can occur due to different routes sharing the same LSID (e.g., an incorrect topology, data integrity issues, black-holing of traffic, software crashes, etc.) are avoided. In addition, the suppressor routes provide IP reachability for the range subsuming the host routes.

Embodiments of the invention described herein may be used for multiple types of LSAs, including OSPF Type 3 LSAs (Summary LSAs), OSPF Type 5 LSAs (external LSAs), and OSPF Type 7 (Not-So-Stubby Area External LSAs). However it should be understood that other types of LSAs may be used in embodiments of the invention described herein.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method performed on a network element implementing an Open Shortest Path First (OSPF) protocol to handle Link State Identifier (LSID) collisions to prevent different link state advertisements (LSAs) associated with different routes from sharing the same LSID, wherein each LSA is identified by an assigned LSID, the method comprising the steps of:

during an LSID assignment process for a first route, performing the following steps:
generating a tentative LSID for the first route;
determining that the value of the tentative LSID is already assigned to an LSA for a second route, and further determining that one of the first and second routes is a host route, wherein the host route is a route that has a host route mask, and wherein the first and second routes are different;
responsive to a determination that the host route is the first route, performing the following step:
suppressing the first route to prevent an LSID collision between the first and second routes, wherein the step of suppressing includes the step of not originating an LSA for the first route;
responsive to a determination that the host route is the second route, performing the following steps:
suppressing the second route to prevent an LSID collision between the first and second routes, wherein the step of suppressing includes the step of purging the LSA for the second route; and originating an LSA for the first route with the value of the tentative LSID;

wherein network reachability for a range subsuming the host route is provided through the one of the first and second routes that is not suppressed; and whereby LSAs for different routes, including host routes, are prevented from sharing the same LSID while each of the routes is reachable even in the presence of suppressed host routes.

2. The method of claim 1, further comprising the step of associating the host route with the other route that is not suppressed such that the host route is automatically unsuppressed when the route it is associated with is withdrawn.

3. The method of claim 2, further comprising the step of: responsive to withdrawal of the host route, disassociating the first and second routes.

4. The method of claim 2, further comprising the steps of: responsive to withdrawal of the one of the first and second routes that is not the host route, wherein withdrawal includes a purging of an LSA associated with that route, unsuppressing the host route including originating an LSA for that route with the LSID that was assigned to the purged LSA.

5. The method of claim 2, further comprising:
performing the following steps during the LSID assignment process performed for a third route having a route mask that is not a host route mask, and wherein the first route is the host route and the second route is associated with the first route:
generating a tentative LSID for the third route;
determining that the value of the tentative LSID for the third route is already assigned to the LSA for the second route, wherein the route mask of the third route is longer than a route mask of the second route; and
responsive to the step of determining, performing the following steps:
disassociating the first and second routes,
purging the LSA for the second route,
associating the third route with the first route, and
originating an LSA for the third route having the value of the tentative LSID that was previously assigned to the LSA for the second route.

6. The method of claim 5, further comprising the steps of:
generating a tentative LSID for the second route;
determining whether the value of the tentative LSID for the second route is assigned to an existing LSA for a different route;
responsive to a determination that the value of the tentative LSID for the second route is not assigned to the existing LSA, assigning that LSID for the second route and originating an LSA for the second route with that assigned LSID; and
responsive to a determination that the value of the tentative LSID for the second route is already assigned to the existing LSA for a fourth route that is a host route, suppressing the fourth route thereby preventing a LSID collision between the second and the fourth routes.

7. The method of claim 1, wherein the step of purging the LSA includes removing a corresponding entry for the second route from a link state database (LSDB), and wherein the step of originating includes adding the originated LSA for into the LSDB.

8. The method of claim 1, further comprising maintaining each suppressed host route in a local OSPF routing information base (RIB) of the network element.

9. The method of claim 1, wherein the first route is received from another network element coupled through the OSPF protocol, redistributed from a routing protocol different from OSPF on the network element, or statically configured.

10. A system for handling Open Shortest Path First (OSPF) Link State Identifier (LSID) collisions to prevent different link state advertisements (LSAs) associated with different routes from sharing a same LSID, wherein each LSA is identified with an assigned LSID, the system comprising:

a customer edge network element that distributes OSPF routes to a first provider edge network element through an OSPF protocol, wherein at least some of the OSPF routes are host routes, wherein a host route is a route that has a host route mask; and the first provider edge network element distributes the OSPF routes to a second provider edge network element through a Border Gateway Protocol (BGP), the first provider edge network element comprising:
an OSPF module that implements the OSPF protocol and generates LSAs and assigns LSIDs to the LSAs, wherein the OSPF module performs the following during LSID assignment:
suppresses those of the OSPF routes that are host routes that otherwise would have corresponding ones of the LSAs with colliding LSIDs with other ones of the LSAs, wherein suppressing includes removal of those of the LSAs associated with the suppressed host routes and not originating those of the LSAs for the suppressed host routes; and
wherein each of those suppressed host routes is reachable through the route associated with the one of the LSAs that had a colliding LSID with that suppressed host route; and
whereby LSAs for different routes, including host routes, are prevented from sharing the same LSID while each of the routes is reachable even in the presence of suppressed host routes.

11. The system of claim 10, wherein the OSPF module of the first provider edge network element further performs the following:
for each suppressed host route, associates that suppressed host route with the route which would otherwise have had a colliding LSID with that suppressed host route.

12. The system of claim 11, wherein for each of those routes which provide network reachability for suppressed host routes, the OSPF module also performs the following:
responsive to a determination that a different OSPF route with a same network prefix as that OSPF route has a smaller route mask, transfers an association from that OSPF route to the different OSPF route; and
wherein each suppressed host route is associated with a single OSPF route at a given time.

13. The system of claim 11, wherein the first provider edge network element further includes the following:
a local OSPF routing information base (RIB) that stores OSPF routes;
a link state database (LSDB);
wherein the OSPF module further maintains suppressed host routes in the local OSPF RIB; and
wherein the OSPF module further adds LSAs for routes that are not suppressed into the LSDB.

14. The system of claim 11, wherein the OSPF module of the first provider edge network element further performs the following:
withdraws OSPF routes that are not host routes including purging corresponding LSAs; and unsuppresses those suppressed host routes that are associated with the withdrawn routes, wherein unsuppresses includes originating LSAs for those unsuppressed host routes.

15. A network element for handling Link State Identifier (LSID) collision to prevent different link state advertisements (LSAs) associated with different routes from sharing a same LSID, wherein each LSA is identified with an assigned LSID, the network element comprising:

an Open Shortest Path First (OSPF) module to maintain a link state database (LSDB) and generate LSAs that include LSIDs, wherein the OSPF module is to perform the following during LSID assignment:

assign the LSIDs to the LSAs for routes based on network prefixes and route masks of the those routes;

suppress those of the routes that are host routes that otherwise would have a corresponding LSA with an LSID that collides with an LSID of a different LSA associated with a different route, wherein a host route is a route that has a host route mask, wherein the suppression of those host routes includes removal of the LSAs associated with the suppressed host routes and not originating LSAs for the suppressed host routes;

wherein for each of the suppressed host routes, a range subsuming that suppressed host route is reachable through the route associated with the LSA that would otherwise have included a colliding LSID with an LSA of that suppressed host route; and whereby host route LSID collisions are avoided to prevent routes from being unreachable or multiple routes pointing to a same LSA.

16. The network element of claim 15, wherein the OSPF module is to receive routes that are learned from other network elements through an OSPF protocol, redistributed from other routing protocols on the network element, or statically configured.

17. The network element of claim 15, further comprising a Border Gateway Protocol (BGP) module to distribute the routes that are not suppressed to a different network element.

18. The network element of claim 15, further comprising a local OSPF routing information base (RIB) that stores OSPF routes, wherein the OSPF module is also to store the suppressed host routes in the local OSPF RIB.

19. The network element of claim 15, wherein the OSPF module is also to perform the following during LSID assignment:

for each suppressed host route, associate that suppressed host route with the route that would otherwise have had a colliding LSID with that suppressed host route.

20. The network element of claim 19, wherein the OSPF module is also to transfer associations between routes that have a same network prefix based on the network prefix of the routes and the length of the route masks of those routes.

* * * * *

UNITED STATES PATENT AND TRADEMARK OFFICE
CERTIFICATE OF CORRECTION

| | | |
|---|---|---|
| PATENT NO. | : 8,289,961 B2 | Page 1 of 1 |
| APPLICATION NO. | : 12/544789 | |
| DATED | : October 16, 2012 | |
| INVENTOR(S) | : Lu et al. | |

It is certified that error appears in the above-identified patent and that said Letters Patent is hereby corrected as shown below:

In Column 8, Line 48, delete ""suppresses""" and insert -- "suppressee" --, therefor.

In Column 21, Line 15, in Claim 15, delete "the those" and insert -- those --, therefor.

Signed and Sealed this
Fifth Day of February, 2013

Teresa Stanek Rea
*Acting Director of the United States Patent and Trademark Office*